United States Patent
Gang et al.

(10) Patent No.: US 7,743,199 B2
(45) Date of Patent: Jun. 22, 2010

(54) METHOD AND APPARATUS FOR OBTAINING TRACE INFORMATION OF MULTIPLE PROCESSORS ON AN SOC USING A SEGMENTED TRACE RING BUS TO ENABLE A FLEXIBLE TRACE OUTPUT CONFIGURATION

(75) Inventors: Zhang Gang, Yamato (JP); Yasuteru Kohda, Yamato (JP); Nobuyuki Ohba, Sendai (JP); Kohji Takano, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 12/108,158

(22) Filed: Apr. 23, 2008

(65) Prior Publication Data

US 2009/0271553 A1    Oct. 29, 2009

(51) Int. Cl.
G06F 13/00    (2006.01)
G01R 31/28    (2006.01)
(52) U.S. Cl. .................... 710/316; 710/38; 714/724
(58) Field of Classification Search .......... 710/38, 710/105, 305, 316; 714/724, 727; 702/118
See application file for complete search history.

(56) References Cited

U.S. PATENT DOCUMENTS

| | | | |
|---|---|---|---|
| 6,425,101 B1 * | 7/2002 | Garreau .................. | 714/727 |
| 6,615,371 B2 * | 9/2003 | McCullough et al. ......... | 714/45 |
| 6,732,307 B1 * | 5/2004 | Edwards .................. | 714/724 |
| 7,035,755 B2 * | 4/2006 | Jones et al. .............. | 702/121 |
| 7,340,564 B2 * | 3/2008 | Twomey .................. | 711/125 |
| 7,389,459 B2 * | 6/2008 | Blasco Allue et al. ....... | 714/733 |
| 7,475,303 B1 * | 1/2009 | Edgar et al. .............. | 714/724 |
| 7,548,090 B2 * | 6/2009 | Redgrave et al. ........... | 326/38 |

(Continued)

FOREIGN PATENT DOCUMENTS

JP    07058762    3/1995

OTHER PUBLICATIONS

An Embedded Debugging Architecture For SoCs, Leatherman et al., IEEE 2006.*

*Primary Examiner*—Khanh Dang
(74) *Attorney, Agent, or Firm*—Cantor Colburn LLP; Vazken Alexanian

(57) ABSTRACT

An integrated bus architecture for transmitting trace information from a plurality of processors included on an integrated chip having one or more peripheral I/O channels comprises a segmented bus having a plurality of segments arranged in a ring topology and configured to transmit trace information in a circular pathway from upstream segments to downstream segments, and one or more trace output circuits each connected to a respective segment and each including a switch configured to be dynamically toggled between enabled and disabled states. The plurality of segments includes a respective segment for each processor having a coupling unit connected to a trace port of the processor. The coupling unit is configured to receive trace information from the trace port, to receive trace information from the adjacent upstream segment, and to transmit items of trace information to the adjacent downstream segment. Each trace output circuit is configured to transmit trace information to a respective peripheral I/O channel when in the enabled state. Each trace output circuit is configured to transmit trace information to the adjacent downstream segment when in the disabled state.

6 Claims, 5 Drawing Sheets

U.S. PATENT DOCUMENTS

2002/0162055 A1* 10/2002 Kurooka et al. ............... 714/45
2003/0105607 A1* 6/2003 Jones et al. .................. 702/121
2006/0259831 A1* 11/2006 Sohm et al. ................... 714/45
2007/0195716 A1* 8/2007 Richter ....................... 370/258
2008/0172586 A1* 7/2008 Whetsel ...................... 714/726

* cited by examiner

METHOD AND APPARATUS FOR OBTAINING TRACE INFORMATION OF MULTIPLE PROCESSORS ON AN SOC USING A SEGMENTED TRACE RING BUS TO ENABLE A FLEXIBLE TRACE OUTPUT CONFIGURATION

BACKGROUND OF THE INVENTION

1. Field of the Invention

Exemplary embodiments of the present invention relate to performing diagnostics on an integrated circuit and, more particularly, to obtaining real-time trace information on programs being executed by multiple processors fabricated on integrated circuits.

2. Description of Background

Tracing instruction or program execution flow is helpful in debugging, or locating causes of problems in software programs being executed by a processor. The term tracing generally refers to process of logging occurrences of specific events during instruction execution. More particularly, the tracing of instruction fetches allows for a captured history of code that has been executed to be obtained. From this information, a determination can be made of steps taken during the program execution to reach the present instruction and state of operation. This is often helpful and sometimes necessary to remove programming errors and to diagnose common problems. In on-line or real-time tracing systems, the target program and the other programs run concurrently, and the data is conveyed between them during instruction execution.

In computer architecture, the combination of a processor (or more than one processor in multiprocessor systems) and main memory (that is, memory that the processor can read and write to directly, with individual instructions) is generally considered to be the heart of a computer. Real-time trace information of program operations executed by a processor can be obtained using the trace function of the processor. For example, the processor may have a physical, dedicated I/O for outputting trace information so that state of the processor can be monitored from outside. In other situations in which the processor has no dedicated I/O for tracing, the operating information of the processor can be output through its General Purpose Input/Output (GPIO) ports.

The term system-on-a-chip (SoC) is used to refer to a single integrated circuit or chip that includes all the components of a computer or other electronic system. As a result of continued advancements in the very-large-scale integration (VLSI) process, more and more circuitry is able to be integrated onto each chip. Thus, the number of processors that can be integrated on a single SoC has been increasing, and it is foreseeable that a single SoC chip may integrate 16 to 128 or more processors in the future. Currently, to obtain real-time operation information for all the processors on such a chip, a separate peripheral I/O channel for tracing each of the integrated processors would be required. For instance, an SoC integrating 128 processors would require 128 peripheral I/O channels for tracing. Because of bandwidth limitations, however, such a large number of peripheral I/O channels are not practical. Furthermore, because the amount of hardware required for a circuit to perform tracing increases as the number of processors increases, it is desirable to implement simpler circuitry for performing tracing.

The number of the peripheral I/O channels available for obtaining trace information on an SoC is also limited by the availability of bus connector placement and issues raised by specific wiring regions on the board, as well as the manufacturing cost. As the parameters of these limitations do not typically manifest until the board is actually being designed and manufactured, the number of peripheral I/O channels that will be available for tracing is hard to estimate prior to designing the SoC. For example, assuming there is an SoC having four processors and four sets of peripheral I/O channels available for tracing, if only one bus connector for tracing can be placed on the board, only one of the four processors can be connected to the bus to provide tracing information. As a result, the trace of the remaining three processors cannot be obtained. Thus, it is desirable to provide for flexibility in connector placement and wiring of the peripheral I/O channels available for tracing on an SoC at the time the board is manufactured to enable trace information on all the processors on the SoC to be obtained.

First Silicon Solutions Ltd. (FS2) has developed a system called Multi-Core Embedded Debug (MED) for performing tracing in multi-core chips. This system provides for a debugging bus in a chip so that information required for debugging can be propagated on the bus for storage in a trace buffer. In particular, the trace information from the processors on the chip is placed on the debugging bus and recorded in the trace buffer. Because the system relies on the connections between this bus and the trace output from each of the processors on the chip, the number of connections that must be made with the bus to obtain trace information for all the processors increases with the number of processors on the chip. If an independent connection to the bus cannot be provided for each processor, more than one processor will compete for a single bus, and only one processor can get the bus grant at a time. This causes the load on the bus to increase, which in turn lowers the operating frequency of the system. That is, even as the number of processors on the chip increases, it becomes difficult to increase the operating frequency of the tracing mechanism. Furthermore, if the number of processors in the design of the chip changes, a corresponding change in the design of the arbitration logic for the bus connections is required, and this has the effect of decreasing the modularity of the system. Accordingly, it is difficult to implement a scalable design in such a system that enables high-speed operation equivalent to the operating frequency of the processor.

SUMMARY OF THE INVENTION

The shortcomings of the prior art can be overcome and additional advantages can be provided through exemplary embodiments of the present invention that are related to an integrated bus architecture for transmitting trace information from a plurality of processors included on an integrated chip. The integrated chip has one or more peripheral I/O channels for outputting trace information to external sources. The bus architecture comprises a segmented bus having a plurality of segments arranged in a ring topology and configured to transmit items of trace information in a circular pathway from upstream segments to downstream segments, and one or more trace output circuits each connected to a respective segment of the plurality of segments and each including a switch configured to be dynamically toggled between an enabled state and a disabled state. The plurality of segments includes a respective segment for each processor of the plurality of processors. The respective segment for each processor has a coupling unit connected to a trace port of the processor. The coupling unit of the respective segment for each processor is configured to receive items of trace information from the trace port of the processor, to receive items of trace information from the adjacent upstream segment of the segmented bus, and to transmit items of trace information to the adjacent downstream segment of the segmented bus. Each trace output circuit is configured to transmit items of trace information being transmitted along the circular pathway to a respective peripheral I/O channel of the one or more peripheral I/O channels when in the enabled state. Each trace output circuit is configured to transmit items of trace information being transmitted along the circular pathway to the adjacent downstream segment of the segmented bus when in the disabled state.

The shortcomings of the prior art can also be overcome and additional advantages can also be provided through exemplary embodiments of the present invention that are related to computer program products, and data processing systems corresponding to the above-summarized method are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented on an integrated circuit or chip that includes multiple processors (for example, an SoC having 16 to 128 or more processors) to provide a mechanism for obtaining trace information from the multiple processors. The mechanism can provide for a number of trace port coupling units on the chip that are adequate for the number of processors on the chip, and the mechanism can provide for flexibility in terms of on-board wiring and placement of connections to available peripheral I/O channels for tracing on the board. Exemplary embodiments can also be implemented to provide a modular, scalable design having simple circuitry that enables high-speed tracing to be performed without diminishing the operating frequency of the processors fabricated on the chip.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention can be implemented on an integrated circuit or chip that includes multiple processors (for example, an SoC having 16 to 128 or more processors) to provide a mechanism for obtaining trace information from the multiple processors. The mechanism can provide for a number of trace port coupling units on the chip that are adequate for the number of processors on the chip, and the mechanism can provide for flexibility in terms of on-board wiring and placement of connections to available peripheral I/O channels for tracing on the board. Exemplary embodiments can also be implemented to provide a modular, scalable design having simple circuitry that enables high-speed tracing to be performed without diminishing the operating frequency of the processors fabricated on the chip.

More particularly, exemplary embodiments of the present invention can be implemented to provide for a bus interface or connecting mechanism for an integrated chip having multiple processors that each includes an independent I/O port outputting trace information. The bus connecting mechanism conveys the trace information for each of the processors on the chip using a ring bus that provides for a separate connection to each of the processors. The ring bus is segmented for each integrated processor and includes a coupling unit for each segment to provide for a modular, scalable design that enables high-speed tracing.

Figure 1A:
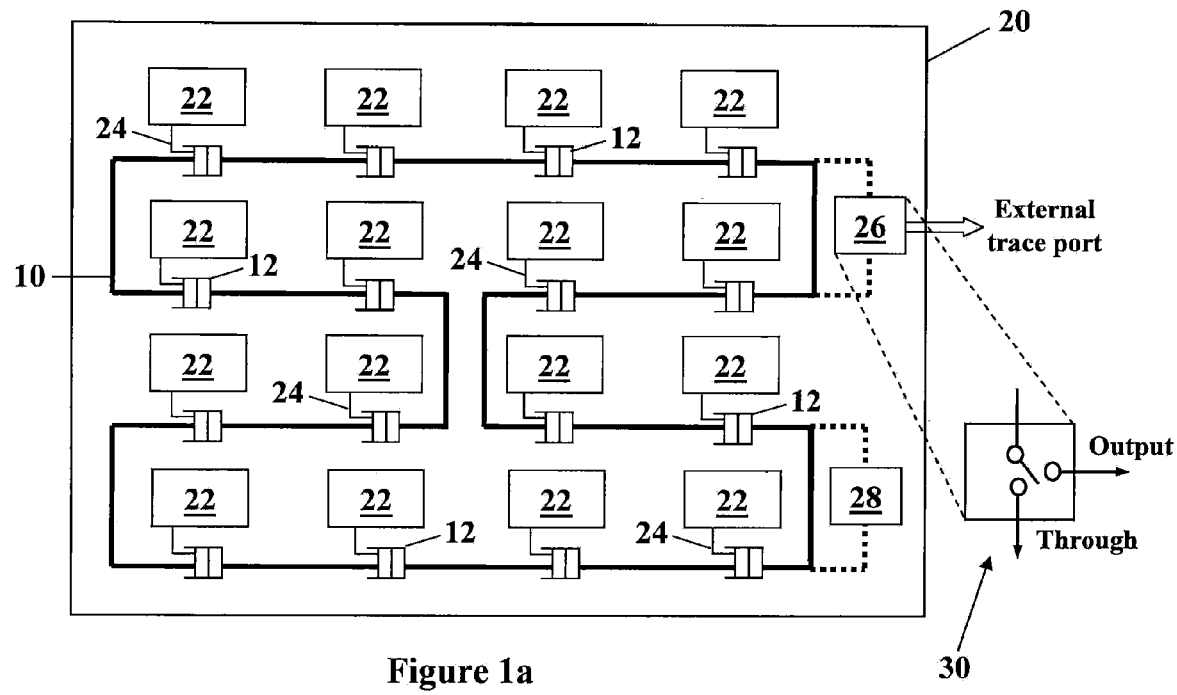
FIGS. 1a-1c are block diagrams illustrating example SoCs in which exemplary embodiments of the present invention are implemented.

Referring now to FIG. 1a, an exemplary embodiment of a ring bus 10 providing a segmented interface in accordance with the present invention implemented on an SoC 20 integrating 16 processors is illustrated. Each of the processors 22 includes I/O ports 24 for outputting trace information from that processor. Thus, each of processors 22 outputs trace information independently of the other processors. The interface of ring bus 10 includes a plurality of coupling units 12 and, more specifically, the interface includes a coupling unit for each of processors 22 that connects the I/O ports for outputting trace information from that processor to a downstream segment and an upstream segment of the ring bus. Thus, all of processors 22 are connected to a single shared transmission line that is able to receive and propagate the trace information from each of the processors simultaneously. The trace information from each of processors 22 is propagated along ring bus 10 from downstream segments to upstream segments sequentially.

In general, the shared communication line provided by a bus is simple to implement and extend, and a ring topology provides for an orderly arrangement in which every processor has access to the bus and the opportunity to transmit trace information. A ring topology typically performs well under a heavy load and is well-suited for creating larger arrangements. Since each segment of the ring bus is a point-to-point connection between two coupling units, each because each segment can transmit data concurrently and asynchronously, it is easy to increase the speed of the ring bus. The interface topology of ring bus 10 enables SoC 20 to be implemented with a trace output circuit 26 that is connected to the ring bus for outputting the trace information from each of processors 22 to, for example, external debugging software or devices to identify problems. In exemplary embodiments, ring bus 10 can also enable an internal trace analysis or problem tracking logic circuit 28 to be implemented on SoC 20 that connects to the ring bus to receive tracing information from each of processors 22.

Figure 1B:
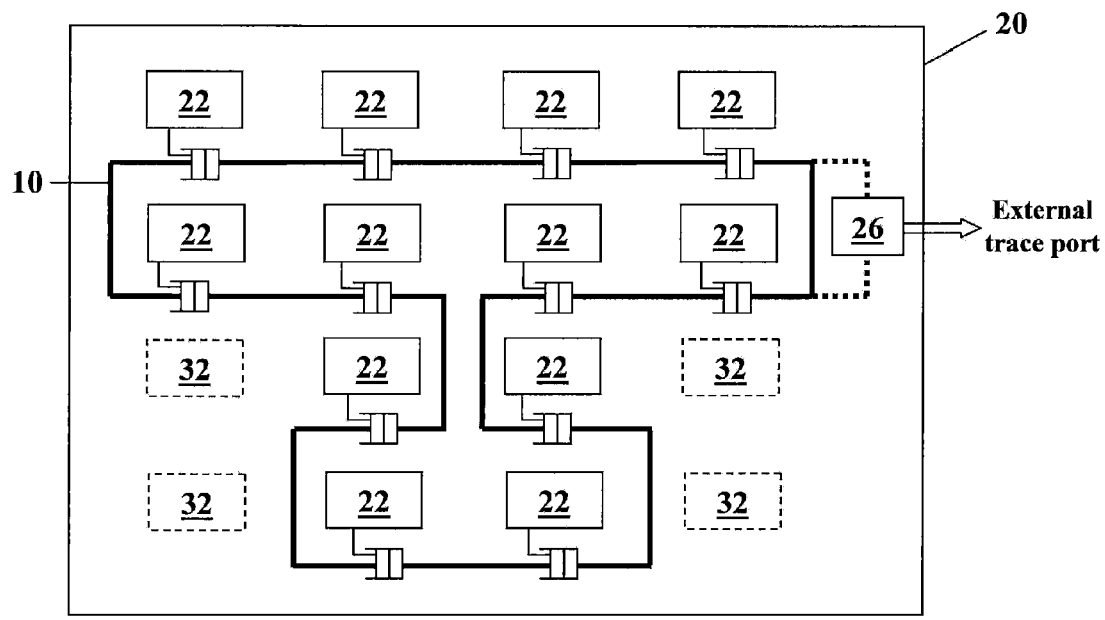

Because ring bus 10 can be viewed as having a pipelined configuration in which the number of "stages" (that is, segments of the ring bus) correlates to the number of processors on the chip, a design change in the number of processors on the chip does not diminish the operating frequency of the tracing mechanism. Because each interface segment of ring bus 10 connects to at least two other segments, with the first and last segments in any view of the mapping being connected to each other to thereby form a circular pathway in which all trace information transmitted between the segments and travels from one segment to the next in a single direction, when a design change in the number of processors on the integrated chip is made, only the number of segments and the number of coupling units of the tracing mechanism will need to be modified, thereby providing for high modularity and scalability. In the exemplary embodiment illustrated in FIG. 1b, the number of processors 22 integrated on SoC 20 was changed from 16 to 12. In the example of FIG. 1b, dotted squares 32 represent the processors removed from the design of FIG. 1a. Thus, because the amount of circuitry for implementing the tracing mechanism will increase as the number of processors increases in various SoC designs, the tracing circuitry can remain as simple desired for the tracing that is to be performed.

Figure 1C:
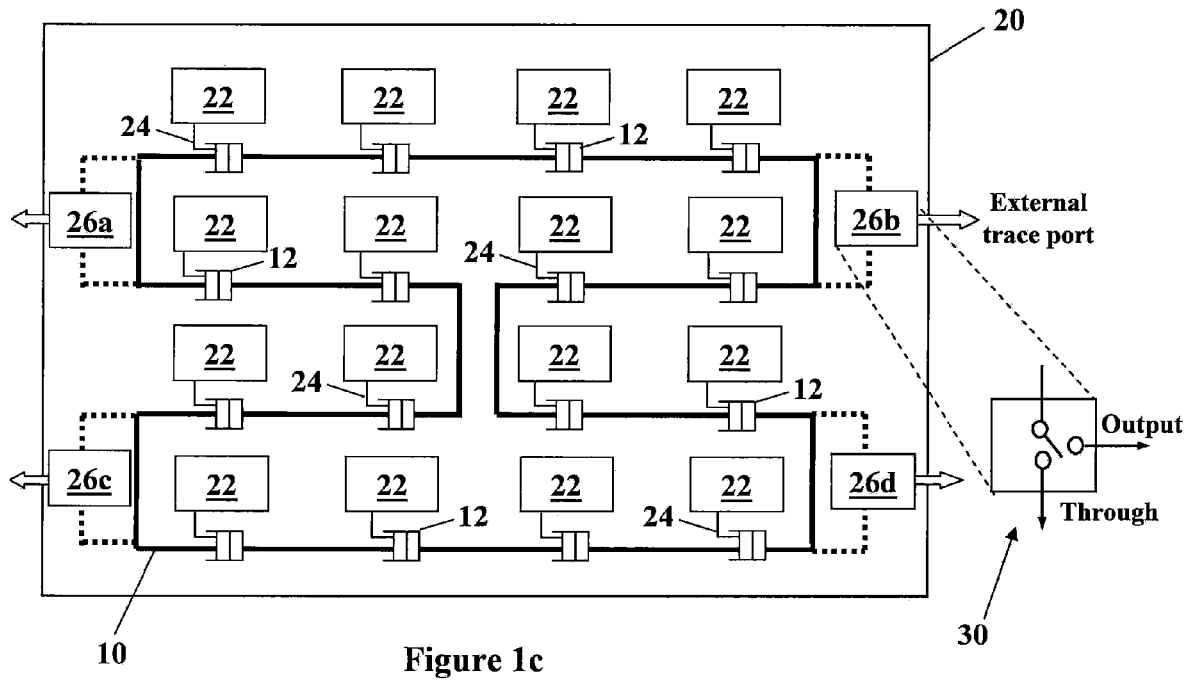

Data items containing the trace information output from processors 22 on SoC 20 are continually propagating through ring bus 10. In alternative exemplary embodiments in which SoC 20 is configured with multiple I/O channels for outputting trace information, as illustrated by the example in FIG. 1c, SoC 20 can be implemented with multiple trace output circuits 26a, 26b, 26c, and 26d that are each connected to ring bus 10 and can be independently and concurrently utilized for outputting trace information for each of processors 22 from the SoC to external sources. This allows for multiple data items of trace information to be output from SoC 20 simultaneously. Furthermore, each trace output circuit can be configured with a dynamically configurable switch circuit, represented generally by 30 in FIG. 1c, for switching the output of data items of trace information from the SoC. Each output trace circuit can be dynamically toggled between enabled ("output") and disabled ("through") states. As a result, in exemplary embodiments can be configured such that all or only a subset of the outputs from the multiple trace output circuits can be used for tracing according to the wiring capability of the board. Thus, if one of the multiple I/O channels is unavailable for outputting trace information (for example, due to connection placement limitations of the chip, the wiring limitations of a particular region on the chip, or the lack of a need for an external source to connect one the I/O channels), that trace output circuit can be set so that the output is disabled ("through"), and thus, the trace information propagating through that trace output circuit is forwarded to the next sequential upstream segment in ring bus 10 rather than being output to an external source. The trace information is then further forwarded along ring bus 10 and can be output by another of the multiple trace output circuits.

Therefore, in exemplary embodiments, the design of the bus connecting mechanism can be flexibly changed according to the limitations of connector placement on the substrate or the availability of connectors for outputting trace information. Specifically, an SoC can be implemented with a ring bus and a number of trace output circuits connected to the ring bus that is specified to be equivalent to the maximum number of I/O channels for outputting trace information available on the SoC when the chip is designed. When the ring bus and the specified number of trace output circuits are mounted on the SoC, the number of I/O channels that will actually be used to output trace information can be determined according to the placement and wiring limitations of the board. That is, of the trace output circuits implemented on the SoC, the number and location(s) of the trace output circuits switched to enabled ("output") can be determined, for example, according to the available placement for connectors that will be implemented on the board or the number of external sources (for example, to debugging software or other devices for analyzing trace information). Any remaining trace output circuits that will not be used for outputting trace information can be disabled ("through") without diminishing the operability of the bus tracing mechanism implemented on the SoC. If a new external source will be used that requires the trace information, one of the trace output circuits that is disabled can be connected to the new external source and enabled to output trace information to the new external source. Furthermore, any new internal circuit for receiving the trace information can be connected to the ring bus, as illustrated in the example of FIG. 1a. Thus, implementations of exemplary embodiments of the present invention can provide for high modularity.

Figure 2:
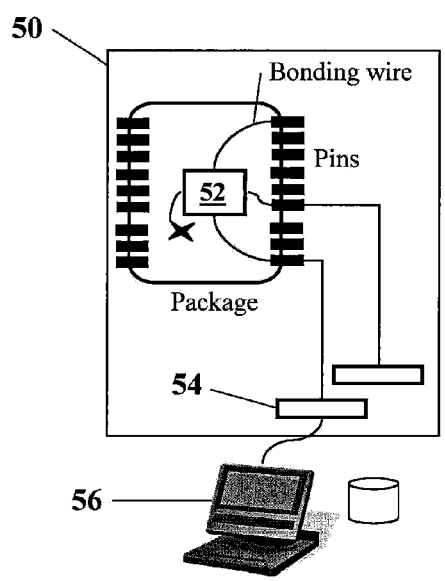
FIG. 2 is an illustration of an example trace information analyzing environment in which an exemplary embodiment of the present invention is implemented on a printed circuit board.

The example depicted in FIG. 2 exhibits this modularity. FIG. 2 shows a printed circuit board (PCB) 50 that includes a die 52 providing four I/O channels for outputting trace information from the board. Only three of these I/O channels are bonded to package pins, and two of these three are hardwired to connectors on PCB 50. One of the I/O channels is connected through a connector 54 to a recorder-analyzer device 56 for receiving the trace information from the board. In exemplary embodiments, the debugging tool is a general purpose IBM-compatible personal computer (PC), although dedicated debugging terminals or systems are certainly within the contemplated scope of the present invention. Thus, utilizing a ring bus connected to four trace output circuits (as in the configuration illustrated in FIG. 1c), one of the four trace output circuits can switched to enabled ("output") for outputting trace information and connected to recorder-analyzer device 56, while the three remaining trace output circuits that will not be used for outputting trace information can be switched to disabled ("through") without diminishing the operability of the bus tracing mechanism implemented on the SoC.

Figure 3A:
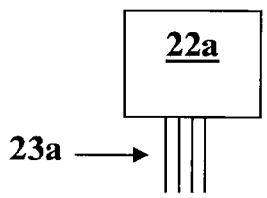
FIGS. 3a-3c are block diagrams illustrating various examples of trace output being provided from a processor with which exemplary embodiments of the present invention can be implemented.
Figure 3B:
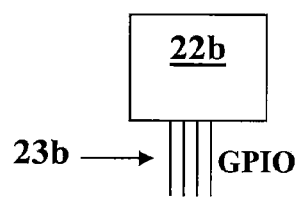
Figure 3C:
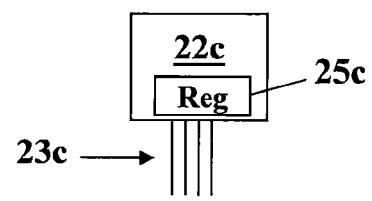

In exemplary embodiments, ring bus 10 can receive trace information output from each of processors 22 on SoC in any suitable fashion. For example, as shown in FIG. 3a, a processor 22a can output a signal containing the trace information to a coupling unit of the ring bus through port-mapped I/O ports 23a using a trace function implemented within the processor. In another example, as shown in FIG. 3b, a processor 22b can output the trace information to a coupling unit of the ring bus through GPIO ports 23b configured to access the main memory or memory mapped I/O on the processor. In yet a further example, as shown in FIG. 3c, a processor 22c can be implemented to include a processor register 25c dedicated to storing and outputting the trace information of the processor to a coupling unit of the ring bus through dedicated I/O ports 23c for tracing.

Figure 4:
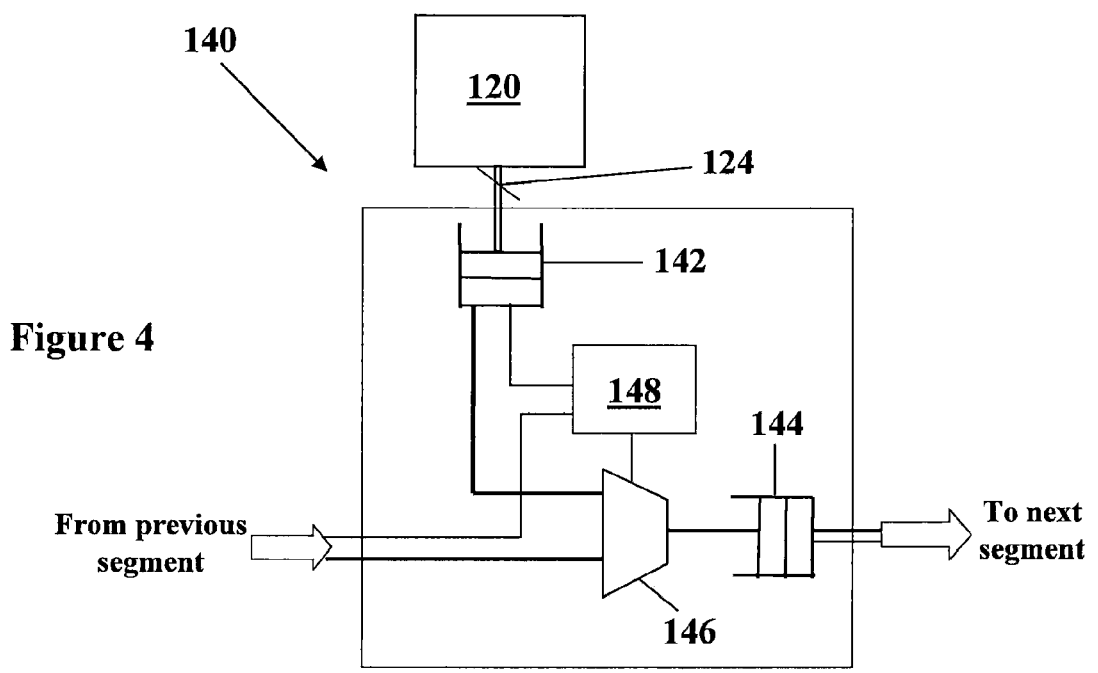
FIG. 4 is a block diagram illustrating a coupling queue unit that can be implemented within exemplary embodiments of the present invention.

In exemplary embodiments, the coupling units of the ring bus can be implemented as queue units for storing and conveying data items of trace information from the processors of the integrated circuit along the ring bus. Referring now to FIG. 4, a coupling queue unit 140 for connecting one segment of a ring bus to I/O ports 124 for outputting data items of trace information from a processor 120 on an integrated circuit in accordance with an exemplary embodiment of the present invention is illustrated. The logical circuitry of queue unit 140 includes a processor-side queue 142 for storing and conveying data items of trace information of processor 120 received from I/O ports 124, and a bus-side queue 144 for storing and conveying data items of trace information from processor 120 and trace information being propagated from previous segments connected to upstream processors along the ring bus on the integrated circuit. This represents the two kinds of input received by queue unit 140, which further includes a 2-to-1 multiplexer 146 that is controlled by a multiplexer selector 148 for selecting which of a data item of trace information from processor-side queue 142 and a data item of trace information from an upstream bus-side queue is forwarded on a given clock cycle to bus-side queue 144 to be output from the queue unit to downstream segments of the ring bus. The maximum number of data items of trace information that can be stored in processor-side and bus-side queues 142, 144 depends on the depths of the respective queues, which, in exemplary embodiments, can determined according to queuing theory conventions or based upon an average and standard deviation of trace data generation results from a simulation.

Figure 5:
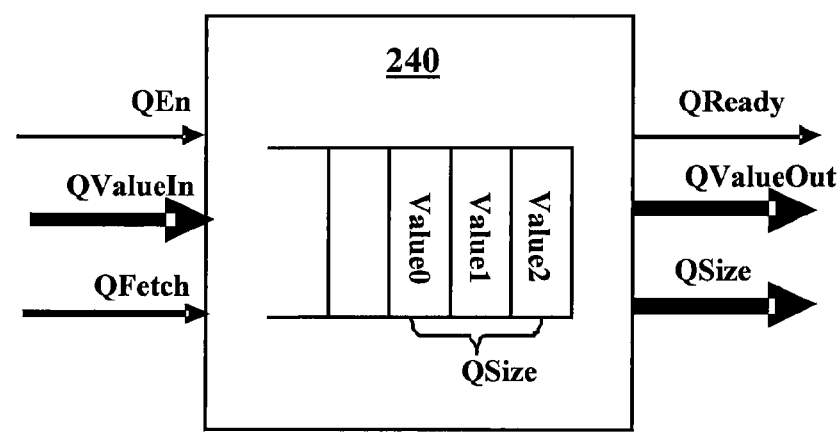
FIG. 5 is a block diagram illustrating a queue architecture that can be implemented within exemplary embodiments of the present invention.

Referring now to FIG. 5, a queue architecture 240 that can be implemented as a processor-side or ring-side queue in exemplary embodiments of the present invention is illustrated. The QvalueIn signal represents the data input (that is, the trace information) to queue 240. The QEn signal specifies whether the data item is valid. When QEn is asserted, the input value QValueIn is pushed to the tail of the queue. When effective data is in queue 240, the Qready signal is asserted. Thus, by observing Qready, it can be determined whether a data item of trace information is stored in the queue. The number of data items of trace information currently stored in queue 240 is indicated by the Qsize signal. The QValueOut signal represents the trace information data output bus from the front or head of the queue. When the next value of queue 240 is required, the data item of trace information at the head of the queue is pulled out by asserting the QFetch signal and the next effective data value item is moved forward to the head of the queue.

Referring again to the exemplary embodiment of FIG. 4, multiplexer selector 148 is configured to implement a bus arbitration scheme for selecting which of either a data item of trace information from processor-side queue 142 or a data item of trace information from an downstream bus-side queue is forwarded on a given clock cycle to bus-side queue 144 when both of the queues propagating the inputs are concurrently indicating that a data item is ready to be forwarded. The arbitration scheme implemented by multiplexer selector 148 can be performed to avoid such collisions, for example, by reading the Qsize signal of both queues or based upon timing if the trace information kept in the queue includes time information. Alternatively, multiplexer selector 148 can be configured to direct that the trace information is forwarded to bus-side queue 144 sequentially from the two inputs in turn. In exemplary embodiments, multiplexer selector 148 can be implemented so that the bus arbitration scheme can be changed dynamically.

Figure 6:
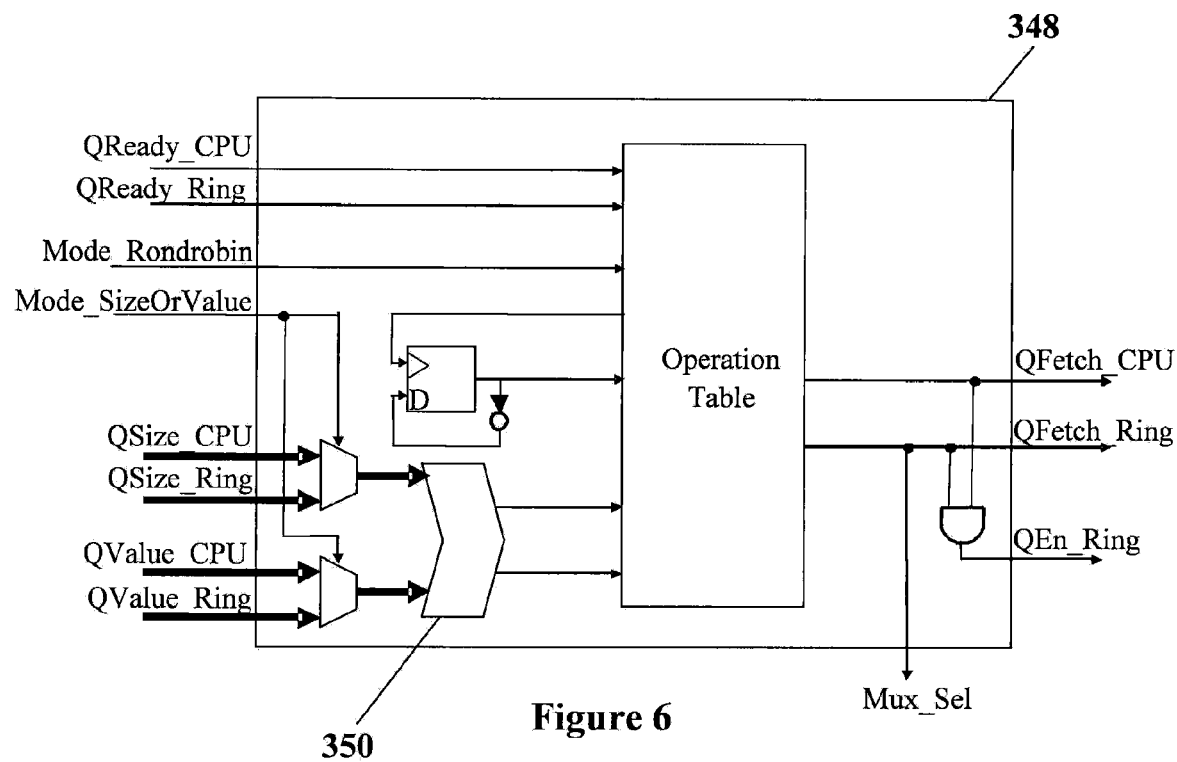
FIG. 6 is a block diagram illustrating a multiplexer selector logic circuit that can be implemented within exemplary embodiments of the present invention.

Referring now to FIG. 6, a multiplexer selector logic circuit 348 that can be implemented within a coupling queue unit in exemplary embodiments of the present invention is illustrated. Multiplexer selector circuit 348 is configured to receive two input signals, Mode_Roundrobin and Mode_SizeOrValue, which are used to select the particular bus arbitration scheme that is performed by the multiplex selector circuit, as will now be described.

More particularly, when Mode_Roundrobin is asserted and data items are ready for input from both queues, the data items trace information are forwarded to the bus-side queue sequentially from the two inputs in turn. When Mode_Roundrobin is not asserted, the priority assigned to the two inputs is determined by a comparator unit 350 according to a parameter such as, for example, the size of the respective queues (as provided by the QSize_CPU input signals) or the time information of the ready data items of trace information in the respective queues (as provided by the QValue_Ring input signals). The specific priority parameter is determined according the value of Mode_SizeOrValue. Thus, in the present exemplary embodiment, if Mode_SizeOrValue is asserted, the number of data items stored in the input processor queue, QSize_CPU, is compared with the number of data items stored in the upstream, input ring bus queue, QSize_Ring, and multiplexer selector 348 retrieves the head data item from the longer queue. If Mode_SizeOrValue is not asserted, the time information of the head data item stored in the input processor queue, QValue_CPU, is compared with the time information of the head data item stored in the upstream, input ring bus queue, QValue_Ring, and multiplexer selector 348 retrieves the data item from the queue that has the older time information.

Once the specific queue from which a data item of trace information data is to be forwarded, either the Qfetch_CPU signal or the Qfetch_Ring signal is asserted so that data item is fetched from the processor-side queue or the bus-side queue of the previous segment. Then, to transfer the data item of the selected queue to the queue of the next segment, multiplexer selector circuit 348 outputs a selecting signal Mux_Sel to the multiplexer of the queue unit, while Qen_Ring is asserted to inform that the data item is valid to the bus-side queue of the queue unit (that is, the bus-side queue configured to forward data items to the next segment).

Because the number of input data values to the multiplexer of the coupling queue unit is fixed to two (that is, the trace information items from the processor-side queue and from the upstream bus-side queue), the fan-in and fan-out of each queue unit in the ring bus circuitry is always fixed, thereby facilitating simple circuitry for implementing the tracing mechanism in VLSI designs, even if the number of processors is changed. Furthermore, ring bus can generally be implemented to run faster than a shared bus, thereby enabling high-speed operation of the tracing mechanism.

Figure 7A:
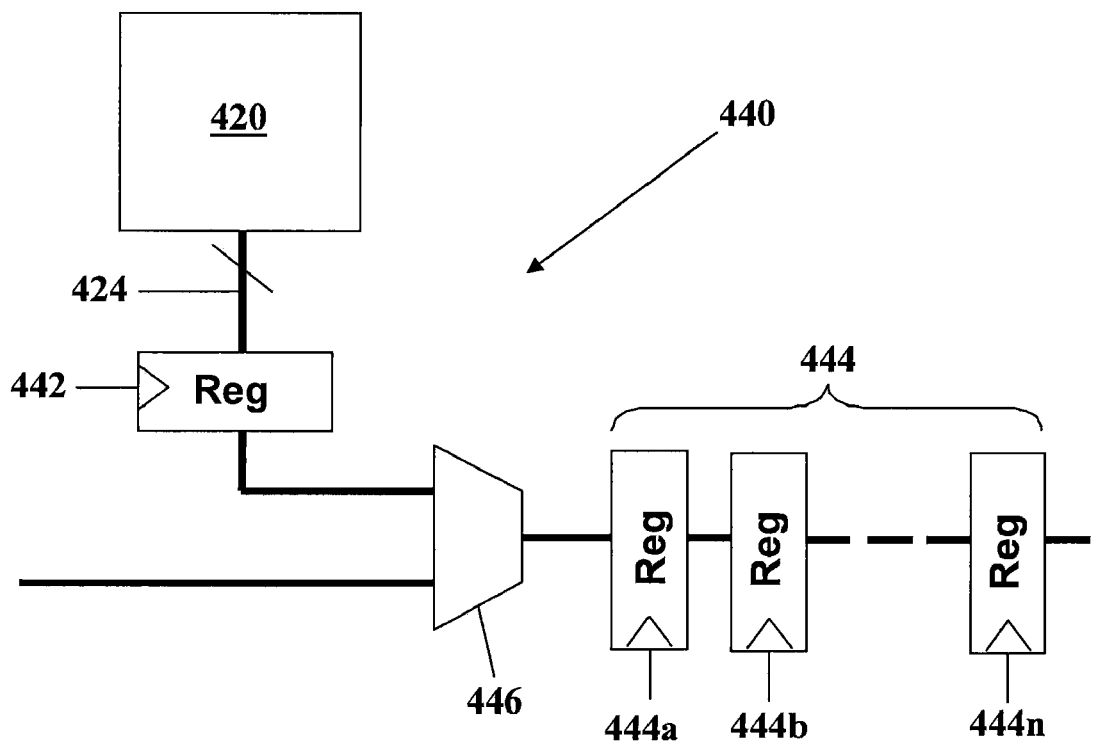
FIGS. 7a and 7b are block diagrams illustrating coupling registers units that can be implemented within exemplary embodiments of the present invention The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.
Figure 7B:
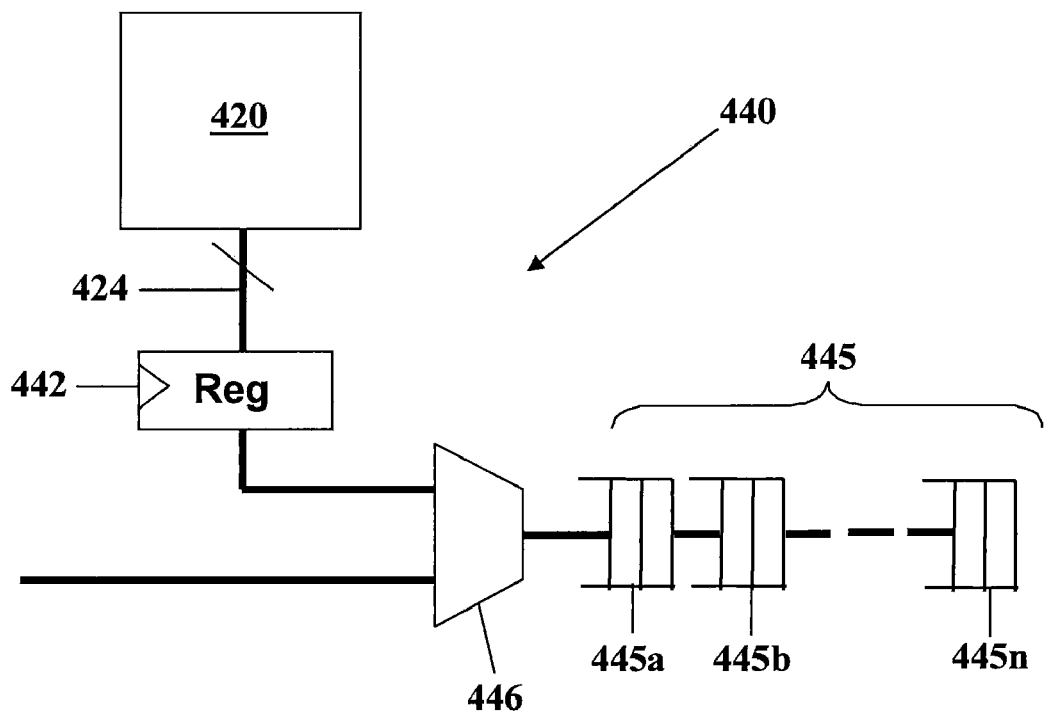

In alternative exemplary embodiments in which the depth of the coupling units of the ring bus is desired to be one (that is, the coupling units are configured to only store a single data item of trace information from a corresponding processor of the integrated circuit), the coupling units can be implemented as register units for storing and conveying trace information from the processors of the integrated circuit to the ring bus one data item at a time. Referring now to FIGS. 7a and 7b, a coupling register unit 440 for connecting one segment of a ring bus to I/O ports 424 for outputting trace information from a processor 420 on an integrated circuit in accordance with an exemplary embodiment of the present invention is illustrated. Register unit 440 include a single register 442 that is used to store one data item of trace information output from processor 420 at a time. A 2-to-1 multiplexer 446 is configured to select which of the data item of trace information in register 442 and the next data item of trace information being propagated from the previous upstream segment of the ring bus is to be forwarded to a bus-side queue structure 444 on a given clock cycle. In exemplary embodiments, as illustrated in FIG. 7a, bus-side queue structure 444 can be implemented as a group of registers 444a, 444b . . . 444n. In alternative exemplary embodiments, as illustrated in FIG. 7b, an alternative bus-side queue structure 445 can be implemented as a group of queues 445a, 445b . . . 445n. The specific configuration of the bus-side queue structure can depend on a desired depth of the bus-side queue (that is, the maximum number of data items that can be concurrently stored in the bus-side queue structure). Such a scalable design can further enable high-speed operation of the tracing mechanism.

Exemplary embodiments of the present invention may be implemented within an integrated circuit such as an SoC. Integrate circuit implementations that include hardware for an exemplary embodiment of a segmented ring bus trace mechanism can be offered as generic gate netlists that comprise a Boolean-algebra representation (expressed using, for example, gates and cells) of the logical function of the chip, analogous to an assembly code listing for a high-level software application. In other exemplary embodiments, the functionality of integrated circuit implementations may be provided as a synthesizable circuit description provided in an HDL, such as Verilog or VHDL, or alternatively as a fully routed design that could be printed directly onto a photo-lithographic mask (also known as a hard macro).

In exemplary embodiments in which a segmented ring bus trace mechanism is implemented within an SoC, the SoC may also integrate one or more microcontroller, microprocessor, or DSP cores; memory blocks including a selection of ROM, RAM, EEPROM, and Flash, timing sources including oscillators and phase-locked loops, peripherals including counter-timers, real-time timers and power-on reset generators, external interfaces including industry standards such as USB, FireWire, Ethernet, USART, SPI, analog interfaces including ADCs and DACs, voltage regulators, and power management circuits, as well as the software that controls the microcontroller, microprocessor, or DSP cores, peripherals, and interfaces. In exemplary embodiments, these blocks can be connected by either a proprietary or industry-standard bus. In exemplary embodiments, DMA controllers can be implemented to route data directly between external interfaces and memory, by-passing the embedded CPU cores, and thereby increasing the data throughput of the SoC. In exemplary embodiments, hardware blocks of the SoC can be constructed using CAD tools to express the required functionality, and the software modules can be integrated using a software development environment.

In developing exemplary embodiments directed to implementations within an integrated circuit that incorporates a segmented ring bus trace mechanism, a designer may initially construct the functionality of the integrated circuit implementation by providing a synthesizable circuit description in a Hardware Descriptive Language (HDL), such as Verilog or VHDL. Performance testing and monitoring of the HDL circuit description can be performed under various loading conditions. For instance, such functional testing may be performed using techniques such as logic simulation, formal verification, emulation, or creating an equivalent pure software model. Additionally, or alternatively, testing may be performed in a hardware bring-up environment.

In exemplary embodiments, after simulation, logic synthesis may be used to transform the HDL design into a large collection of lower-level constructs called standard cells. These constructs can be taken from a standard-cell library consisting of pre-characterized collections of gates (for example, 2 input nor, 2 input n and, inverters, etc.). The standard cells are typically specific to the planned manufacturer of the integrated circuit. The resulting collection of standard cells, plus the needed electrical connections between them, can be provided as a gate-level netlist that comprise a Boolean-algebra representation of the circuit's logical function, analogous to an assembly code listing for a high-level software application. The gate-level netlist can then be processed by a placement tool that attempts to find a placement of the standard cells onto a region representing the final integrated circuit, subject to a variety of specified constraints. A routing tool may then use the physical placement of the standard cells and the netlist to create the electrical connections therebetween. The routing output is a file that corresponds to a fully routed design that can be printed directly onto one or more photo-lithographic masks (also known as a hard macros), which can then enable the production of physical integrated circuits using semiconductor fabrication, such as by using Complimentary Metal Oxide Silicon (CMOS) technology.

Accordingly, aspects of exemplary embodiments of the present invention may be realized in hardware, software, firmware, or a combination thereof. Exemplary embodiments may be realized in a centralized fashion in at least one computer system or in a distributed fashion where different elements are spread across several interconnected computer systems. Any kind of computer system or other apparatus adapted for carrying out the mechanisms described herein is suited. A typical combination of hardware, software, and firmware may be a general-purpose computer system with a computer program that, when being loaded and executed, controls the computer system such that it carries out the methods described herein.

Exemplary embodiments of the present invention may be implemented as a board level product, as a single chip, within an integrated circuit, or with varying levels integrated on a single chip and other portions of the system as separate components. In exemplary embodiments, the degree of integration of the implementation can be primarily determined by speed and cost considerations. Because of the sophisticated nature of modern processors, it is possible to utilize a commercially available processor, which may be implemented external to integrated circuit implementations of exemplary embodiments of the present invention. In alternative exemplary embodiments, if the processor is available as an integrated circuit or logic block, then the commercially available processor may be implemented as part of an integrated circuit device having various functions implemented as firmware.

Exemplary embodiments of the present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. Of course, other meanings of computer program within the understanding of those skilled in the art are also contemplated by exemplary embodiments of the present invention.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. An integrated bus architecture for transmitting trace information from a plurality of processors included on an integrated chip, the integrated chip having one or more peripheral I/O channels for outputting trace information to external sources, the bus architecture comprising:

a segmented bus having a plurality of segments arranged in a ring topology and configured to transmit items of trace information in a circular pathway from upstream segments to downstream segments, the plurality of segments including a respective segment for each processor of the plurality of processors, the respective segment for each processor having a coupling unit connected to a trace port of the processor, the coupling unit of the respective segment for each processor being configured to receive items of trace information from the trace port of the processor, to receive items of trace information from the adjacent upstream segment of the segmented bus, and to transmit items of trace information to the adjacent downstream segment of the segmented bus; and one or more trace output circuits each connected to a respective segment of the plurality of segments and each including a switch configured to be dynamically toggled between an enabled state and a disabled state, each trace output circuit being configured to transmit items of trace information being transmitted along the circular pathway to a respective peripheral I/O channel of the one or more peripheral I/O channels when in the enabled state, each trace output circuit being configured to transmit items of trace information being transmitted along the circular pathway to the adjacent downstream segment of the segmented bus when in the disabled state.

2. The bus architecture of claim 1, further comprising an on-board trace analysis circuit connected to a respective segment of the plurality of segments, the trace analysis circuit to analyze items of trace information being transmitted along the circular pathway.

3. The bus architecture of claim 1, wherein the trace port of each processor of the plurality of processors comprises one of port-mapped I/O ports configured output items of trace information received from a trace function implemented on the processor, general purpose I/O ports configured to access a memory unit on the processor to receive items of trace information, or dedicated I/O ports configured to receive items of trace information from a processor register implemented on the processor.

4. The bus architecture of claim 1, wherein the coupling unit of the respective segment for each processor comprises a processor-side queue unit configured to store and transmit items of trace information received from the trace port of the processor, a multiplexer circuit configured to receive and selectively transmit items of trace information from the processor-side queue unit and items of trace information from the adjacent upstream segment of the segmented bus according to reconfigurable bus arbitration logic, and a bus-side queue unit configured to store and transmit items of trace information received from the multiplexer circuit to the adjacent downstream segment of the segmented bus.

5. The bus architecture of claim 1, wherein the coupling unit of the respective segment for each processor comprises a processor-side register configured to store and transmit items of trace information received from the trace port of the processor, a multiplexer circuit configured to receive and selectively transmit items of trace information from the processor-side register and items of trace information from the adjacent upstream segment of the segmented bus according to reconfigurable bus arbitration logic, and a bus-side queue structure configured to store and transmit items of trace information received from the multiplexer circuit to the adjacent downstream segment of the segmented bus.

6. The bus architecture of claim 5, wherein the bus-side queue structure comprises one of a plurality of registers arranged in series or a plurality of queue units arranged in series.

* * * * *